US010019739B1

(12) United States Patent
Packer et al.

(10) Patent No.: US 10,019,739 B1
(45) Date of Patent: Jul. 10, 2018

(54) ENERGY USAGE ALERTS FOR A CLIMATE CONTROL DEVICE

(71) Applicant: Opower, Inc., Arlington, VA (US)

(72) Inventors: Benjamin Packer, Palo Alto, CA (US); Agustin Fonts, Santa Clara, CA (US)

(73) Assignee: OPOWER, INC., Arlington, VA (US)

( * ) Notice: Subject to any disclaimer, the term of this patent is extended or adjusted under 35 U.S.C. 154(b) by 0 days.

(21) Appl. No.: 14/451,203

(22) Filed: Aug. 4, 2014

Related U.S. Application Data

(60) Provisional application No. 61/984,592, filed on Apr. 25, 2014.

(51) Int. Cl.

| | |
|---|---|
| ***G06F 1/26*** | (2006.01) |
| ***G06F 11/00*** | (2006.01) |
| ***G06Q 20/00*** | (2012.01) |
| ***G06Q 30/04*** | (2012.01) |
| ***G05F 1/66*** | (2006.01) |
| ***G06Q 20/14*** | (2012.01) |
| ***G06Q 50/06*** | (2012.01) |

(52) U.S. Cl.
CPC ............... *G06Q 30/04* (2013.01); *G05F 1/66* (2013.01); *G06Q 20/145* (2013.01); *G06Q 50/06* (2013.01)

(58) Field of Classification Search
CPC ...... G06Q 30/04; G06Q 20/102; G06Q 50/06; G06Q 30/02; G06Q 99/00; G05D 23/1917; F24F 11/0012; G06F 1/26
USPC ................... 705/34, 412, 7.31; 700/278, 291
See application file for complete search history.

(56) References Cited

U.S. PATENT DOCUMENTS 4,334,275 A 6/1982 Levine
4,843,575 A 6/1989 Crane
(Continued)

FOREIGN PATENT DOCUMENTS

AU 2010315015 7/2014
CA 2779754 5/2011
(Continued)

OTHER PUBLICATIONS

International Search Report and Written Opinion for PCT Application No. PCT/US2015/038692, dated Sep. 24, 2015, 13 pages.
(Continued)

*Primary Examiner* — Oluseye Iwarere
(74) *Attorney, Agent, or Firm* — Cooper Legal Group, LLC

(57) ABSTRACT

Techniques for energy usage alerts for a climate control device are provided. A computing device can determine a target budget for a specified budget period. The target budget may relate to a desired energy usage amount for a corresponding utility customer. The computing device can obtain usage data relating to actual energy usage by a property associated with the corresponding utility customer or a component of the property. The computing device can determine a projected use relating to an estimated energy usage for remaining days in the specified budget period based on the usage data. The computing device can generate a message including a projected bill for the corresponding utility customer based on the usage data and the projected use. The computing device can send the message to a climate control device associated with the corresponding utility customer based on the projected bill being greater than the target budget.

20 Claims, 7 Drawing Sheets

(56) References Cited

U.S. PATENT DOCUMENTS 5,513,519 A 5/1996 Cauger et al.
5,566,084 A 10/1996 Cmar
5,717,609 A 2/1998 Packa et al.
5,855,011 A 12/1998 Tatsuoka
5,873,251 A 2/1999 Iino
5,930,773 A 7/1999 Crooks et al.
5,930,803 A 7/1999 Becker et al.
5,948,303 A 9/1999 Larson
6,035,285 A 3/2000 Schlect et al.
6,088,688 A 7/2000 Crooks et al.
6,273,814 B1 8/2001 Komoto
6,295,504 B1 9/2001 Ye et al.
6,327,605 B2 12/2001 Arakawa et al.
6,354,940 B1 3/2002 Itou et al.
D462,077 S 8/2002 Greminger
6,539,736 B1 4/2003 Isazawa et al.
6,606,104 B1 8/2003 Kondo et al.
6,701,298 B1 3/2004 Jutsen
6,732,055 B2 5/2004 Bagepalli et al.
6,778,945 B2 8/2004 Chassin et al.
6,785,620 B2 8/2004 Kishlock et al.
6,972,660 B1 12/2005 Montgomery, Jr. et al.
7,020,508 B2 3/2006 Stivoric et al.
7,073,073 B1 7/2006 Nonaka et al.
7,073,075 B2 7/2006 Freyman et al.
7,136,710 B1 11/2006 Hoffberg et al.
7,142,949 B2 11/2006 Brewster et al.
7,149,727 B1 12/2006 Nicholls et al.
7,200,468 B2 4/2007 Ruhnke et al.
7,243,044 B2 7/2007 McCalla
7,333,880 B2 2/2008 Brewster et al.
7,356,548 B1 4/2008 Culp et al.
7,444,251 B2 10/2008 Nikovski et al.
7,460,502 B2 12/2008 Arima et al.
7,460,899 B2 12/2008 Almen
7,552,030 B2 6/2009 Guralnik et al.
7,561,977 B2 7/2009 Horst et al.
D605,652 S 12/2009 Plaisted et al.
7,878,890 B2 2/2011 Toyohara et al.
D635,988 S 4/2011 Mays et al.
7,991,513 B2 8/2011 Pitt
8,065,098 B2 11/2011 Gautam
8,166,047 B1 4/2012 Cohen et al.
D660,317 S 5/2012 Jesberger
D660,867 S 5/2012 Marchetti
8,180,591 B2 5/2012 Yuen et al.
D665,411 S 8/2012 Rai et al.
8,239,178 B2 8/2012 Gray et al.
D667,841 S 9/2012 Rai et al.
8,260,468 B2 9/2012 Ippolito et al.
8,275,635 B2 9/2012 Stivoric et al.
8,280,536 B1 10/2012 Fadell et al.
D671,550 S 11/2012 Chen et al.
8,348,840 B2 1/2013 Heit et al.
8,375,118 B2 2/2013 Hao
8,417,061 B2 4/2013 Kennedy et al.
8,428,785 B2 4/2013 Boucher et al.
8,429,630 B2 4/2013 Nickolov et al.
D682,882 S 5/2013 Cahill et al.
8,478,447 B2 7/2013 Fadell et al.
8,489,245 B2 7/2013 Carrel et al.
D687,445 S 8/2013 Fuhrmann
D694,252 S 11/2013 Helm
8,583,288 B1 11/2013 Rossi et al.
D697,526 S 1/2014 Bruck et al.
8,630,741 B1 1/2014 Matsuoka et al.
8,660,813 B2 2/2014 Curtis et al.
D703,690 S 4/2014 MacCubbin et al.
8,690,751 B2 4/2014 Auphan
D705,263 S 5/2014 Hartley
D707,245 S 6/2014 Bruck et al.
8,751,432 B2 6/2014 Berg-Sonne et al.
D710,871 S 8/2014 McCormack et al.
8,805,000 B2 8/2014 Derby et al.
8,818,758 B1 8/2014 Singh et al.
D714,335 S 9/2014 Cojuangco et al.
8,868,248 B2 10/2014 Park
D717,328 S 11/2014 Lin
D720,767 S 1/2015 Miller et al.
8,954,849 B2 2/2015 Doi et al.
D725,133 S 3/2015 Smirin et al.
D725,664 S 3/2015 Nies et al.
D729,268 S 5/2015 Nies et al.
D730,386 S 5/2015 Ryan et al.
9,031,703 B2 5/2015 Nakamura et al.
D731,538 S 6/2015 Lee
D732,049 S 6/2015 Amin
D732,062 S 6/2015 Kwon
D740,847 S 10/2015 Yampolskiy et al.
2001/0047290 A1 11/2001 Petras et al.
2002/0065581 A1 5/2002 Fasca
2002/0149611 A1 10/2002 May
2002/0178047 A1 11/2002 Or et al.
2002/0198629 A1 12/2002 Ellis
2003/0011486 A1* 1/2003 Ying ........................ 340/825.69
2003/0018517 A1 1/2003 Dull et al.
2003/0023467 A1 1/2003 Moldovan
2003/0216971 A1 11/2003 Sick et al.
2004/0024717 A1 2/2004 Sneeringer
2004/0073537 A1 4/2004 Thiesson et al.
2004/0111410 A1 6/2004 Burgoon et al.
2004/0140908 A1 7/2004 Gladwin et al.
2005/0040247 A1 2/2005 Pouchak
2005/0257540 A1 11/2005 Choi et al.
2006/0089851 A1 4/2006 Silby et al.
2006/0093222 A1 5/2006 Saffer et al.
2006/0103549 A1 5/2006 Hunt et al.
2006/0195438 A1 8/2006 Galuten
2006/0246968 A1 11/2006 Dyke-Wells
2007/0061735 A1 3/2007 Hoffberg et al.
2007/0185835 A1 8/2007 Ursitti et al.
2007/0198459 A1 8/2007 Boone et al.
2007/0203860 A1* 8/2007 Golden .................. G06Q 10/04
705/412
2007/0213992 A1 9/2007 Anderson et al.
2007/0255457 A1 11/2007 Whitcomb et al.
2007/0260405 A1 11/2007 McConnell et al.
2007/0270994 A1 11/2007 Dobson et al.
2008/0027885 A1 1/2008 van Putten et al.
2008/0033587 A1 2/2008 Kurita et al.
2008/0167535 A1 7/2008 Stivoric et al.
2008/0189632 A1 8/2008 Tien et al.
2008/0195561 A1 8/2008 Herzig
2008/0222561 A1 9/2008 Helfman et al.
2008/0244429 A1 10/2008 Stading
2008/0281473 A1* 11/2008 Pitt ............................... 700/291
2008/0281763 A1 11/2008 Yliniemi
2008/0304112 A1 12/2008 Matsuno
2008/0306985 A1 12/2008 Murray et al.
2009/0106202 A1 4/2009 Mizrahi
2009/0106674 A1 4/2009 Bray et al.
2009/0204267 A1 8/2009 Sustaeta et al.
2009/0217175 A1 8/2009 Bechtel et al.
2009/0217179 A1 8/2009 Mons et al.
2009/0326726 A1 12/2009 Ippolito et al.
2010/0025483 A1 2/2010 Hoeynck et al.
2010/0076835 A1 3/2010 Silverman
2010/0082174 A1* 4/2010 Weaver ......................... 700/295
2010/0099954 A1 4/2010 Dickinson et al.
2010/0106575 A1 4/2010 Bixby et al.
2010/0138363 A1* 6/2010 Batterberry et al. ......... 705/412
2010/0156665 A1 6/2010 Krzyzanowski et al.
2010/0179704 A1 7/2010 Ozog
2010/0180223 A1 7/2010 Speier
2010/0198713 A1* 8/2010 Forbes et al. .................. 705/34
2010/0217452 A1 8/2010 McCord et al.
2010/0217549 A1 8/2010 Galvin et al.
2010/0217550 A1 8/2010 Crabtree et al.
2010/0217642 A1 8/2010 Crubtree et al.
2010/0217651 A1 8/2010 Crabtree et al.
2010/0232671 A1 9/2010 Dam et al.
2010/0241648 A1 9/2010 Ito et al.
2010/0286937 A1 11/2010 Hedley et al.
2010/0289643 A1 11/2010 Trundle

(56) References Cited

U.S. PATENT DOCUMENTS

2010/0324962 A1 12/2010 Nesler et al.
2010/0332373 A1 12/2010 Crabtree et al.
2011/0022429 A1 1/2011 Yates et al.
2011/0023045 A1 1/2011 Yates et al.
2011/0040666 A1 2/2011 Crabtree et al.
2011/0055131 A1 3/2011 Chen
2011/0061014 A1 3/2011 Frader-Thompson et al.
2011/0063126 A1 3/2011 Kennedy et al.
2011/0106316 A1* 5/2011 Drew et al. .................. 700/278
2011/0106328 A1 5/2011 Zhou et al.
2011/0106471 A1 5/2011 Curtis et al.
2011/0153102 A1 6/2011 Tyagi et al.
2011/0178842 A1 7/2011 Rane et al.
2011/0178937 A1 7/2011 Bowman
2011/0190951 A1 8/2011 Lee
2011/0205245 A1 8/2011 Kennedy et al.
2011/0231028 A1* 9/2011 Ozog .................... G06Q 10/06 700/291
2011/0231320 A1* 9/2011 Irving ............................ 705/80
2011/0251730 A1* 10/2011 Pitt .............................. 700/291
2011/0251807 A1 10/2011 Rada et al.
2011/0282505 A1 11/2011 Tomita et al.
2011/0313964 A1 12/2011 Sanchey Loureda et al.
2012/0036250 A1 2/2012 Vaswani et al.
2012/0053740 A1 3/2012 Venkatakrishnan et al.
2012/0066168 A1 3/2012 Fadell et al.
2012/0078417 A1 3/2012 Connell, II et al.
2012/0084063 A1 4/2012 Drees et al.
2012/0117503 A1 5/2012 Hofrichter et al.
2012/0179692 A1 7/2012 Hsiao et al.
2012/0215369 A1 8/2012 Desai et al.
2012/0216123 A1 8/2012 Shklovskii et al.
2012/0259678 A1 10/2012 Overturf et al.
2012/0290230 A1 11/2012 Berges Gonzalez et al.
2012/0310708 A1 12/2012 Curtis et al.
2013/0060531 A1 3/2013 Burke et al.
2013/0060720 A1 3/2013 Burke
2013/0097177 A1 4/2013 Fan et al.
2013/0097481 A1 4/2013 Kotler et al.
2013/0103656 A1 4/2013 Sanchez Loureda et al.
2013/0173064 A1 7/2013 Fadell
2013/0253709 A1 9/2013 Renggli et al.
2013/0261799 A1 10/2013 Kuhlmann et al.
2013/0262040 A1 10/2013 Buckley
2014/0006314 A1 1/2014 Yu et al.
2014/0019319 A1 1/2014 Derby et al.
2014/0074300 A1 3/2014 Shilts et al.
2014/0107850 A1 4/2014 Curtis
2014/0148706 A1 5/2014 Van Treeck et al.
2014/0163746 A1* 6/2014 Drew et al. .................. 700/276
2014/0207292 A1 7/2014 Ramagem et al.
2014/0337107 A1 11/2014 Foster
2015/0198345 A1* 7/2015 Bicknell ............... G05B 15/02 700/276
2015/0227522 A1 8/2015 O'Donnell et al.
2015/0227846 A1 8/2015 Mercer et al.
2015/0254246 A1 9/2015 Sheth et al.
2015/0267935 A1* 9/2015 Devenish ............ F24F 11/0086 700/278
2015/0269664 A1 9/2015 Davidson
2015/0300831 A1 10/2015 Sernicola
2015/0310019 A1 10/2015 Royer et al.
2015/0310463 A1 10/2015 Turfboer et al.
2015/0310465 A1 10/2015 Chan et al.
2015/0319119 A1 11/2015 Ryu et al.
2015/0324819 A1 11/2015 Lin et al.
2015/0326679 A1 11/2015 Lin et al.

FOREIGN PATENT DOCUMENTS

CA 2832211 11/2012
DE 3703387 8/1987
DE 102011077522 12/2012
EP 0003010 7/1979
EP 2705440 3/2014
EP 2496991 9/2014
GB 1525656 9/1978
GB 2238405 5/1991
JP 2000-270379 9/2000
JP 2004-233118 8/2004
JP 2006-119931 5/2006
JP 2007-133468 5/2007
JP 2011-027305 2/2011
JP 2012-080679 4/2012
JP 2012-080681 4/2012
JP 2013-020307 1/2013
WO WO 03/102865 12/2003
WO WO 03/104941 12/2003
WO WO 2008/101248 8/2008
WO WO 2009/085610 7/2009
WO WO 2011/057072 5/2011
WO WO 2012/112358 8/2012
WO WO 2012/154566 11/2012
WO WO 2014/004148 1/2014
WO WO 2014/182656 11/2014

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archieve.org/web/2008019005509/http://www.climatecrisis.net/takeaction/carbonca/.
Author Unknown, "Calculate Your Impact," Jul. 28, 2008, 4 pages, available at http://web.archieve.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archieve.org/web/20080708193253/http://www.nature.org/initiatives/climate change/calculator/2008.
Author Unknown, "CoolClimate Calculator," May 19,2008, 15 pages, available at http://web.archieve.orgi/web/20080519220643/bie.berkeley.edu/coolcale/calculations.html.
Author Unknown, "Lifecycle Climate Footprint Calculator," Berkeley Institute of the Environment, Nov. 23, 2007, 6 pages, available at http://web.archieve.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.

(56) References Cited

OTHER PUBLICATIONS

De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, Cuny Nber, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "Prism: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Solfware, vol. 33, Iss. 1, pp. 1-22, Jan. 2010.
Goldberg, Miriam L., et al., "Refraction of Prism Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.
Liang, Jian, et al., "Load Signature Study-Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
NEST, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f..uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.
Aragon, Liz, "Black and White Emoticons," posted at Sweet Clip Art, posting date Apr. 29, 2012. © 2011 2015 Elizabeth J. Aragon, [online], [site visited Nov. 18, 2015], available at http://sweetcllpart.com/blackandwhiteemotions836>.
Blaine, Joel, "Seven Cities and a Utility Company Team Up to Deliver Energy Savings," posted at Dept. of Energy, posting date Aug. 1, 2011, [online], [site visited Nov. 13, 2015], available at http://energy.gov/articles/sevencities—andutilitycompanyteamdeliverresidentialenergysavings>.
Boonmas, Sunyaluk, "Stock Photo: 16 Smiley Face Icon Set"—Image: 39092543, posting date not given, Copyright © 2000-2015 Dreamstime.com, available at http://www.dreamstime.com/stockphotossmileyfaceiconsetmaximumyouremotionsthshowshappysadsurprisewowetcimage39092543>.
Freepik, Surprised emoticon square face with open eyes and mouth, posted at Flat Icon, posting date not given. © 2013-2015 Graphic Resources SL. [online], [site visited Nov. 18, 2015], available at http://www.flaticon.com/freeicon/surprisedemoticonsquarefacewithopeneyesandmouth_ 42835>.
Gelber, Bob, "This Is Not a Bill," posted at Not a Mystery, posting date Apr. 18, 2015, [online], [site visited Nov. 13, 2015], available at http://notamystery.com/2015/04/18/not_worth_the_papeUts_printed_on/>.
Karsten, "Green nudge: The classic social comparison experiment by Opower," posted at iNudgeyou, posting date Nov. 28, 2012, [online], [site visited Nov. 12, 2015], available at http://inudgeyou.com/greennudgetheclassicsocialcomparisonexperimentbyopower/>.
Laskey, Alex, et al., "OPOWER," posted at ACM, posting date Jun. 2011, Copyright © 2015 by the ACM. [online], [site visited Nov. 13, 2015], available at http://xrds.acm.org/article.cfm?aid=1961687>.
Marshall, Jonathan, "PG&E Home Energy Reports Stimulate Big Customer Savings," posted at PG&E Currents, posting date May 14, 2014, © 2014 Pacific Gas and Electric Company. [online], [site visited Nov. 13, 2015], available at http://www.pgecurrents.com/2014/05/14/pgehomeenergyreportsstimulatebigcustomersavings/>.
Morabito, Kerri, "High User Campaign," posted at Kerri Morabito, posting date not given, © Kerri Morabito 2015. [online], [site visited Nov. 13, 2015] . Available from Internet, <URL: http://www.kerrimorabito.com/high-user-campaign.html>.
Rocheleau, Jake, "38 Amazingly Well-Designed Emoji Iconsets," posted at SpyreStudios, posting date Mar. 25, 2015, SpyreStudios © 2015, [online], [site visited Nov. 18, 2015], available at http://spyrestudios.com/38welldesignedemojiiconsets/>.
Sen, Ashish, et al. "Regression Analysis—Theory, Methods, and Applications," 1990, 27 pages, Springer-Verlag, New York.

* cited by examiner

ENERGY USAGE ALERTS FOR A CLIMATE CONTROL DEVICE

CROSS-REFERENCE TO RELATED APPLICATIONS

The present application claims the benefit of priority to U.S. Provisional Application Ser. No. 61/984,592, filed Apr. 25, 2014, entitled "THERMOSTAT BILL ALERTS," which is hereby incorporated by reference in its entirety.

BACKGROUND

The subject technology relates to data processing systems, and in particular, to energy usage alerts for a climate control device.

Energy users typically do not have knowledge of how much energy has been consumed and/or how large a utility bill is expected to grow until the energy user receives a utility bill. In some approaches, the energy user can actively manage energy usage by performing certain power conservation actions (e.g., budgets, usage adjustments). However, the task of consistently creating a budget for the utility bill or consistently taking action to alter power usage to meet a certain budgeted amount poses increasing challenges that adversely impact the energy user experience.

SUMMARY

According to various aspects of the subject technology, systems and methods for energy usage alerts for a climate control device are described.

In an aspect, a computing device for energy usage alerts includes at least one processor and memory storing instructions that, when executed by the at least one processor, cause a computing device to perform specified operations. The computing device can determine a target budget corresponding to a specified budget period. The target budget may relate to a desired energy usage amount for a corresponding utility customer. The computing device can obtain usage data relating to actual energy usage by one or more of a property associated with the corresponding utility customer or a component of the property. The computing device can determine a projected use relating to an estimated energy usage for a remaining amount of time in the specified budget period based at least in part on the usage data. The computing device can generate a message including an indication of a projected bill for the corresponding utility customer based at least in part on the usage data and the projected use. The computing device further can send the message to a climate control device associated with the corresponding utility customer based at least in part on a determination that the projected bill is greater than the target budget.

In another aspect, a computer-implemented method for energy usage alerts is described. The method includes determining a target budget corresponding to a specified time period. The target budget may relate to a desired energy usage amount for a corresponding utility customer. The method also includes obtaining usage data relating to actual energy usage by one or more of a property associated with the corresponding utility customer or a component of the property. The method also includes determining a projected use relating to an estimated energy usage for a remaining amount of time in the specified time period based at least in part on the usage data. The method also includes steps for generating a message including an indication of a projected bill for the corresponding utility customer based at least in part on the usage data and the projected use and sending the message to a climate control device associated with the corresponding utility customer based at least in part on a determination that the projected bill is greater than the target budget.

In still another aspect, a non-transitory computer readable storage medium storing instructions for energy usage alerts on a computing device is described. The instructions, when executed by a processor, cause the processor to perform specified operations. The computing device can determine a target budget corresponding to a specified time period. The target budget may relate to a desired energy usage amount for a corresponding utility customer. The computing device can obtain usage data relating to actual energy usage by one or more of a property associated with the corresponding utility customer or a component of the property. The computing device can determine a projected use relating to an estimated energy usage for a remaining amount of time in the specified time period based at least in part on the usage data. The computing device can generate a message including an indication of a projected bill for the corresponding utility customer based at least in part on the usage data and the projected use. The computing device further can send the message to a climate control device associated with the corresponding utility customer based at least in part on a determination that the projected bill is greater than the target budget.

BRIEF DESCRIPTION OF THE DRAWINGS

In the following description, reference is made to the following figures, and in which are shown by way of illustration specific embodiments in which the subject technology may be practiced. It is to be understood that other embodiments may be utilized and changes may be made without departing from the scope of the subject technology.

DETAILED DESCRIPTION

Figure 1:
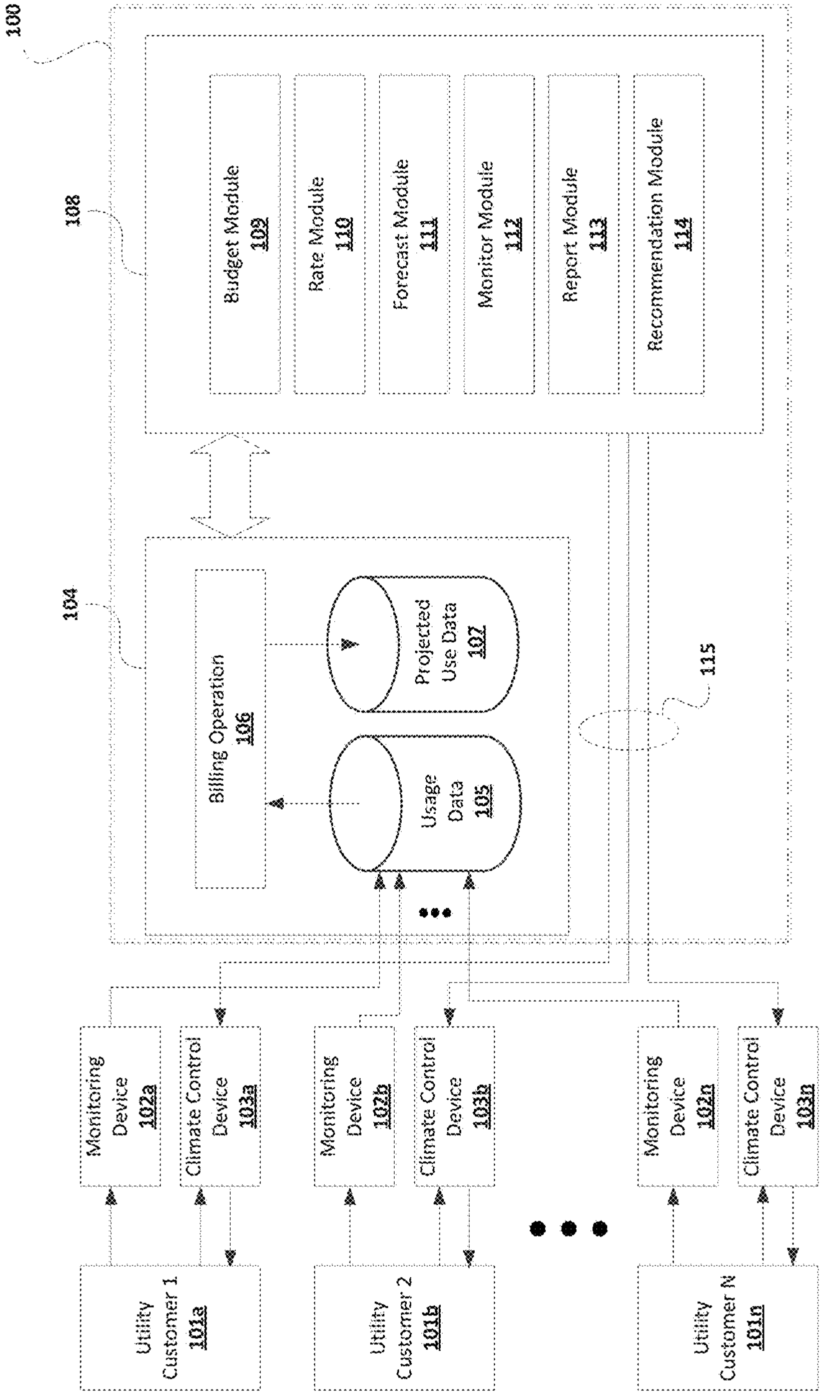
FIG. 1 illustrates an example of an energy usage alert system, according to certain aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The subject technology allows for a target budget to be set for a user, a projected use to be calculated for the user based on the retrieved usage data for the user, and a budgeting communication to be transmitted to a user's climate control device (e.g., a thermostat) if the projected use is greater than the target budget. In certain implementations, the budgeting communication may cause the thermostat to alert the user that the user's resource usage is projected to exceed the targeted budget, provide recommendations on how to meet the targeted budget, and/or automatically adjust thermostat settings to meet the targeted budget.

In some aspects, a computing device (e.g., an energy billing management system) can determine a target budget corresponding to a specified budget period. The target budget may relate to a desired energy usage amount for a corresponding utility customer. The computing device can obtain usage data relating to actual energy usage by one or more of a property associated with the corresponding utility customer or a component of the property. The computing device can determine a projected use relating to an estimated energy usage for a remaining amount of time in the specified budget period based at least in part on the usage data. The computing device can generate a message including an indication of a projected bill for the corresponding utility customer based at least in part on the usage data and the projected use. The computing device further can send the message to a climate control device associated with the corresponding utility customer based at least in part on a determination that the projected bill is greater than the target budget.

The "system" described herein may be implemented on a server, a climate control device, or on a computing device in communication with the climate control device. The climate control device may represent one or more of a thermostat, an application running on a computing device, or a computing device coupled to the thermostat depending on implementation. The term "usage" described herein refers to a quantity of use, a cost associated with the use, or a quantified metric representing the use or cost. The term "actual energy usage" described herein refers to a meter reading or a usage reading. The term "commodity" described herein refers to a utility-based commodity, such as electricity, water, and natural gas, which are consumable finite resources delivered to a dwelling or a commercial structure. The term "component of a property" described herein refers to a component associated with the property that is able to consume a commodity. One example of a component of a property may be a heating, ventilation and air conditioning (HVAC) system that controls the climate within the property using electricity, natural gas, and/or another commodity. The component may relate to one or more of a central heating device, a central air conditioning and heating system, an appliance, an electronic device, water heating system, a power generating device, a ventilation system, or an air filtration system.

FIG. 1 illustrates an example of an energy usage alert system 100, according to certain aspects of the subject technology. The energy usage alert system 100 includes a utility management system 104 and a billing management system 108. The utility management system 104 is coupled to utility customers 101 via monitoring devices 102 and climate control devices 103. The utility management system 104 includes usage database 105, a billing operation module 106 and projected use database 107. The billing management system 108 includes a budget module 109, a rate module 110, a forecast module 111, a monitor module 112, a report module 113 and a recommendation module 114. The billing management system 108 may convey information targeted to one or more of the utility customers 101*a*-101*n* over communication channels 115.

The utility management system 104 stores usage data in the usage database 105. The usage data is associated with one or more commodities consumed by the utility customers 101. The usage data may include usage information corresponding to usage of at least one of the one or more commodities for multiple utility customers (e.g., utility customers 101*a*, 101*b* . . . 101*n*). The usage-information may include past usage information of the commodity during at least one of completed billing period and a current usage of the at least one of the one or more commodities during a completed portion of a current billing period. The usage data for a utility customer may be obtained from a corresponding monitoring device on a scheduled basis, periodic basis or a non-scheduled basis. The monitoring devices (e.g., monitoring devices 102*a*, 102*b* . . . 102*n*) may relate to an advanced metering infrastructure (AMI). In this respect, the monitoring devices may be smart meters or, at least in part, include smart meter functionality for measuring electrical, water and/or natural gas consumption in the property associated with the corresponding utility customer. For example, the usage data may consist of usage information corresponding to the property in its entirety such that usage information relating to one or more components in the property is disaggregated by the utility management system 104 and/or the billing management system 108. In an aspect, the utility management system 104 stores and forwards the usage data to the billing management system 108 for usage alert processing. The utility management system 104 may forward the usage data to the billing management system 108 for storage and usage alert processing. The utility management system 104 described herein may refer to a utility company or an offsite third party service provider that is interfaced with the utility company.

The utility management system 104 stores projected use information in the projected use database 107. The projected use information may be based on the usage data and estimated usage for a remaining amount of time in the current billing period. For example, the billing operation module 106 may obtain the usage data to determine a rate of use for the corresponding utility customer. The rate of use may be based on the amount of energy consumed over a specified number of days, for example. The rate of use may be applied to the remaining amount of time to determine the estimated usage. As such, the projected use information may consist of the usage data to date and the estimated usage for the remaining time in the billing period. A more detailed description of the projected use determination will be described in FIG. 2.

The budget module 109 may determine a target budget for the current billing period based on the usage data. In an aspect, the budget module 109 may include a budget advisor, which is an automated system for at least determining one or more candidate budget targets. The rate module 110 may store a local copy of a rate schedule associated with the fees for commodities provided by the utility company. The rate module 110 may be configured to obtain the rate schedule, associated with the current billing period, from the utility company. The forecast module 111 may be configured to forecast the projected use of energy by the utility customers 101*a*-101*n* based on the corresponding usage data. The forecast module 111 may include an algorithm used to determine the projected use information using rate of use information and billing period information. The monitor module 112 may include an interface to the monitoring devices 102*a*-102*n* to obtain the usage data directly and/or include an interface with the utility management system 104 to receive the usage data for further processing by one or more components of the billing management system 108 (e.g., projected use information, rate of use information, target budgets). The report module 113 may be configured to generate a usage alert notification, and cause the usage alert notification to be sent to one or more of the utility customers 101*a*-101*n* based on one or more reporting conditions (e.g., projected bill exceeding target budget, current billing period ended, utility customer inquiry, etc.) through the communication channels 115.

The communication channels 115 may carry alert notifications to the utility customers 101*a*-101*n* over a wired and/or a wireless communication. In an aspect, the billing management system 108 sends the alert notifications in a broadcast and/or multicast signal to the utility customers 101*a*-101*n* via the climate control devices 103*a*-103*n*. The billing management system 108 may specifically target one or more of the utility customers 101*a*-101*n*, and send a personalized alert notification over a unicast signal. The communication channels 115 may be configured to interface to a smart meter (e.g., the monitoring devices 102*a*-102*n*), a thermostat (e.g., the climate control device 103*a*-103*n*), a customer's mobile device, a data exchange interface of a cellular network, and other networks.

In operation, the energy usage alert system 100 allows for a target budget to be set for each of the utility customers 101*a*-101*n*, a projected use to be calculated for the utility customer 101 based on the retrieved usage data for that utility customer, and a budgeting communication to be transmitted to a climate control device 103 (e.g., a thermostat) of that utility customer if the projected use is determined to be greater than the target budget. In certain implementations, the budgeting communication may cause the thermostat to alert the utility customer that the utility customer's resource usage is projected to exceed the targeted budget, provide recommendations on how to meet the targeted budget, and/or automatically adjust thermostat settings to meet the targeted budget.

Figure 2:
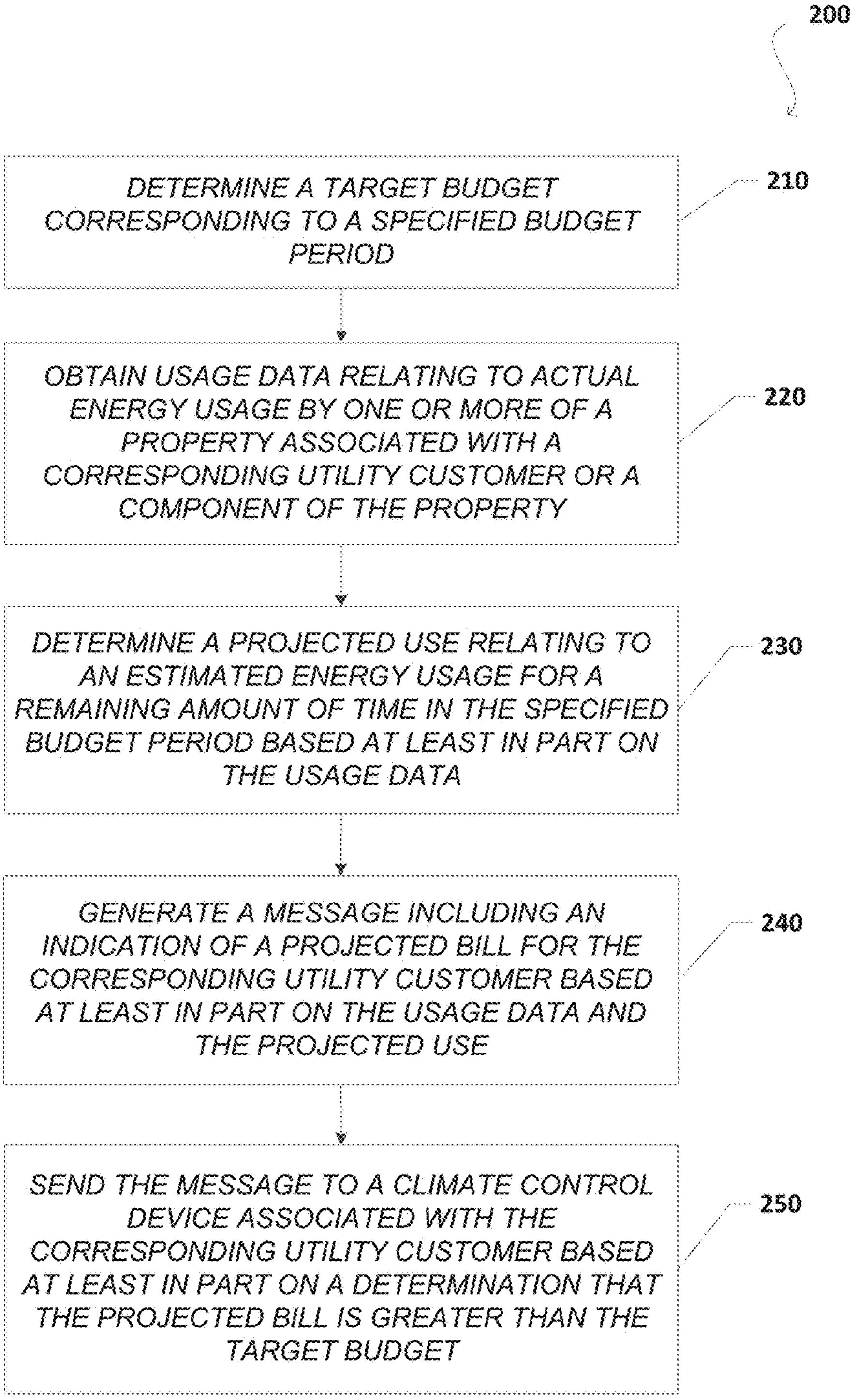
FIG. 2 illustrates a flowchart of an example process for energy usage alerts in the energy usage alert system described in FIG. 1, according to certain aspects of the subject technology.

FIG. 2 illustrates a flowchart of an example process 200 for energy usage alerts in the energy usage alert system described in FIG. 1, according to certain aspects of the subject technology. The example process 200 is provided merely as an example and additional or fewer steps may be performed in similar or alternative orders, or in parallel, within the scope of the various embodiments described in this specification.

In step 210, a computing device (e.g., the billing management system 108) can determine a target budget corresponding to a specified budget period (e.g., the current billing period). As described herein, the terms "specified budget period" and "specified time period" relate to a billing cycle that is associated with a predetermined budget (e.g., a target budget), and can be used interchangeably in the present disclosure. In some implementations, one or more budgets may be identified and each budget may be expressed as a monetary value or an amount of energy used for the budgeted period. Furthermore, the budgets may be related to the cost or amount of energy used by a property and/or the cost or amount of energy used by one or more energy consumption components (e.g., an appliance, an HVAC system, etc.) of the property.

In some aspects, a thermostat (e.g., the climate control devices 103*a*-103*n*) may provide an interface with which the user may select the one or more candidate target budgets. For example, data may be sent to the thermostat to cause a prompt to be displayed on the interface and the prompt including one or more options relating to the candidate target budgets. In turn, the thermostat may receive an input based at least in part on the prompt. The input may include a selection of at least one of the one or more options in response to the prompt. In this respect, the target budget may be determined using the selected option. Although the user may select the budgets, a budget advisor provided by the computing device may suggest one or more candidate budgets that the user may select from. In some aspects, the computing device selects one or more budgets for the user and displays the budgets to the user on the thermostat interface. The user may confirm the system selected target budgets, and the budget information may be provided to the computing device.

The budget(s) suggested or selected by the computing device may be identified based on the user's energy usage history, the usage history of similar users (e.g., neighbors or related utility customers), or the usage history of other utility customers. For example, one budget may be 5% less than the user's average usage for the past year. The usage histories may be for the property as a whole and/or disaggregated to show the different components of energy use (e.g., energy usage attributable to an HVAC system). The budgets may be determined using average values of usage histories, linear regressions of usage data, or using some other predictive model.

In step 220, the computing device can obtain usage data relating to actual energy usage by one or more of a property associated with the corresponding utility customer or a component of the property. For example, the computing device may monitor a user's energy usage.

In step 230, the computing device can determine a projected use relating to an estimated energy usage for a remaining amount of time in the specified budget period based at least in part on the usage data. In this respect, the computing device may calculate a projected use for the specified budget period (e.g., a monthly billing cycle). The projected use for the specified budget period may be calculated using the following equation:

$$\text{Projected Use} = \text{Actual Use} + (\text{Rate of Use} \times \text{Time Left}) \quad (1)$$

where "Actual Use" is the amount of energy used to date (e.g., monetary value ($20), amount of energy used (1.4 kW)) in the specified budget period, "Rate of Use" is the rate that the user expends energy (e.g., $3.5/day, 0.75 kW/week, etc.), and "Time Left" is the amount of time left in the specified budget period (e.g., 15 days, 2.15 weeks, etc.). The rate of use may be calculated based on the user's usage history (e.g., based on an average rate for the past 6 months, usage rate during the same time in one or more previous years, average usage rate for a weekday or weekend, usage rates for previous months, etc.).

In some aspects, linear regression techniques and/or use of a thermodynamic model may also be used to determine the projected use. For example, the thermodynamic model may be configured to estimate the HVAC runtime for a property over some future time horizon using forecasted weather data, which can either be obtained from a third party service provider (e.g., Weather Underground®) or estimated based on historical weather data. In an aspect, the estimated HVAC runtime can be converted to kWh/$ via a converter.

Examples of thermodynamic modeling to determine the rate of use (or runtime) are described in U.S. patent application Ser. No. 13/839,082, which is hereby incorporated by reference in its entirety.

In certain implementations, information regarding thermostats such as how fast a given home will heat up or cool down given that the HVAC is either on or off may be obtained. In some aspects, rate information of recent days is obtained. The rate information may include time of day, inside temperature, outside temperature, and other factors relating to the climate of the property. A model that captures these parameters as well as the interactions between the parameters can yield rate estimations.

The model has a notion of the indoor temperature, outdoor temperature, thermostat set points, HVAC state, solar radiation, and possibly other weather conditions (e.g., humidity, cloud cover, etc.) for every time step that the model simulates. In some aspects, time steps can be at any resolution (seconds, minutes, hours, etc.). For retrospective analysis, the primary source of data for the model can be one or more of an indoor temperature, an HVAC state, thermostat set point information obtained from network connected thermostats, an outdoor temperature, past solar radiation, or other weather conditions obtained from weather stations. Other data may include HVAC power and square footage.

For forecasting, the primary source of data for the model is thermostat set point information obtained from the schedules of users with network connected thermostats, outdoor temperature, solar radiation, and possibly other weather conditions obtained from weather forecasts. The original source data is transformed into a format that can be consumed by the model by matching the source data readings to each time step that the model accounts for. For example, if the time step resolution is 1 minute and the outdoor temperature readings occur every 15 minutes, the outdoor temperature for a given time step can be the outdoor temperature at the most recent reading. The outdoor temperature for a given time step may be an interpolation of outdoor temperatures, including the most recent and subsequent reading. In certain implementations, the model may be expressed as shown below:

$$\text{indoor\_tempi+1}=\alpha*\text{indoor\_tempi}+(1-\alpha)*(\text{outdoor\_tempi}-\text{hvac\_statei}*\beta+\text{solar\_radiationi}*\gamma)+\text{noisei} \quad (2)$$

where hvac_statei=hvac_function(setpointi, indoor_tempi, hvac_statei-1), $\alpha$, $\beta$, $\gamma$ are thermodynamic characteristics of the home, $\alpha$ measures the insulation of the home, $\beta$ measures the strength of HVAC, and $\gamma$ measures strength of solar radiation during the daytime.

In some aspects, hvac_function( ) is a function of the current set point and indoor temperature as well as the previous HVAC state. Further components and parameters encapsulating other effects on the indoor temperature can be added by introducing a new data component (e.g., humidity) and a corresponding parameter expressed as follows:

$$\text{indoor\_tempi+1}=\alpha*\text{indoor\_tempi}+(1-\alpha)*(\text{outdoor\_tempi}-\text{hvac\_statei}*\beta+\text{solar\_radiationi}*\gamma+\text{humidityi})+\text{noisei} \quad (3)$$

In certain implementations, a heuristic process may be performed to prune out points and implement a linear regression. The linear regression may be observed using a model of each point as a sum of three components: (1) base load, (2) extra load attributable to the HVAC runtime in a specified time period (e.g., an hour), and (3) extra load attributable to other aspects of the property. The parameters can be a single number for the first component, a single number for the second component (e.g., multiplies the number of minutes of heating usage in the specified time period), and a distribution for the third component (e.g., a normal or Gamma distribution representing the noise). In turn, the parameter for the second component can yield the intended result (e.g., "How many kilo-watt-hours (kWh) one minute of HVAC runtime uses").

For implementations that include a target budget for an energy consumption component of a property (e.g., an HVAC system), similar techniques to those described above may be used. However, energy usage data for that particular component should be obtained first. In some aspects, special metering devices may provide the system with usage data for that particular component. In other aspects, energy usage attributed to the energy consumption component may be disaggregated from the energy usage data for the property as a whole. Examples of HVAC energy disaggregation are described in U.S. Pat. No. 8,660,813, which is hereby incorporated by reference in its entirety. For example, a regression analysis may be performed to determine one or more coefficients relating to climate control energy use and/or non-climate control energy use. Another method of disaggregating HVAC energy usage includes using probabilistic graphical modeling. For example, a data set of usage data can be analyzed to predict an output data set, to classify the output as a set of categories, to cluster the data set into different types or clusters of data points, to determine a causal inference from the data set, and/or to characterize one or more data points of the data set. Probabilistic graphical models (PGMs) may be implemented in a broad range of tasks, including but not limited to, logistic regression, linear regression, Hidden Markov Models, Bayes Nets, Markov Nets, and neural networks.

In step 240, the computing device can generate a message including an indication of a projected bill for the corresponding utility customer based at least in part on the usage data and the projected use. The computing device may provide budgeting communications to the climate control device (e.g., the climate control devices 103*a*-103*n*) to inform the user of the amount of the budget used to date and/or alert the user if the projected use exceeds the budgeted use (e.g., the target budget).

The computing device may provide recommendations on how to modify usage so that actual usage can remain within the budgeted use for the specified budget period.

Recommendations may include set points or set point schedules that may be used on the climate control device. For example, using thermodynamic modeling and/or hourly or daily weather forecast data, the HVAC runtime based on a current thermostat setting can be determined including how much the HVAC runtime can be curtailed using a new set of set point schedules. Other techniques for providing recommended set points include (a) a rule-based suggestion (e.g., a suggestion to move one or more set points to be 1 or 2 degrees more efficient, or making the number of degrees suggested to be proportional to a "budgeted remaining use" and a "projected remaining use") and (b) using linear regression or a similar scheme that predicts a number of degrees based on past usage to alter a set point schedule.

Other recommendations may be directed to other energy usage components on the property (e.g., time shifting washer/dryer usage, turning off lights, closing/opening windows when outside conditions satisfy certain characteristics, etc.). According to some implementations, the computing device may automatically adjust settings on the thermostat to modify usage so that actual usage can remain within the budgeted use for the specified budget period.

In step 250, the computing device can send the message to a climate control device (e.g., the climate control devices 103*a*-103*n*) associated with the corresponding utility customer based at least in part on a determination that the projected bill is greater than the target budget.

Figure 3:
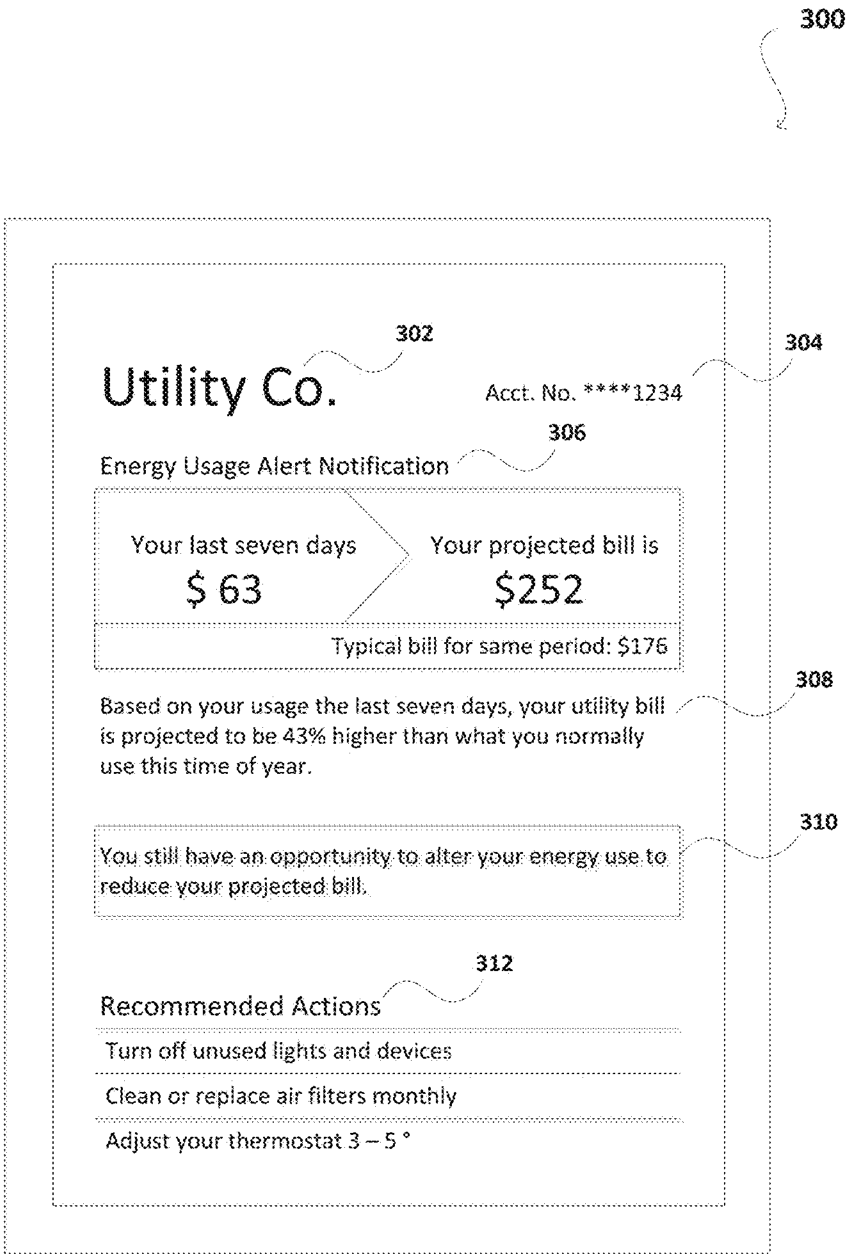
FIG. 3 illustrates an example of an energy usage alert notification, according to certain aspects of the subject technology.

FIG. 3 illustrates an example of an energy usage alert notification 300, according to certain aspects of the subject technology. The energy usage alert notification 300 includes a utility identifier 302, an account number 304, an alert title 306, a report analysis 308, a report message 310, and a recommendation portion 312. The energy usage alert notification 300 is provided merely as an example and additional or fewer features may be included in similar or alternative formats within the scope of the various embodiments described in this specification.

The utility identifier 302 may relate to the utility company associated with the generation of the energy usage alert notification 300. The utility identifier 302 may include a name of the utility company, an address for the utility company, and/or contact information for the utility company.

The account number 304 may relate to the corresponding utility customer subscribed to receive energy usage alerts such as the energy usage alert notification 300. For privacy reasons, the account number 304 may be limited to a subset of numbers that, at least in part, identify the utility account. In an aspect, the account number 304 is displayed in its entirety.

The alert title 306 provides an identification of the type of notification contained in the energy usage alert notification 300. For example, the alert title 306 may relate to a power conservation alert where the notification 300 provides the utility customer an indication on how to save energy and/or money for the current billing period. In this respect, the energy usage alert notification 300 may be sent to the utility customer before the end of the current billing period to allow the utility customer sufficient time to make certain adjustments to current climate control settings of the corresponding property.

The report analysis 308 may include information relating to how the current projected bill compares to prior utility bills, and may include a metric to give the utility customer some context to the current projected bill. The report analysis 308 may include additional metrics such as a chart to provide the utility customer a visual analysis of the current projected bill.

The report message 310 may include an indication to the utility customer that the projected bill can still be altered if certain adjustments can be made prior to the end of the current billing period. The report message 310 also may include other report messages relating to the current projected bill such as usage information relating to specific components of the property and/or rate information over the duration of the current billing period.

The recommendation portion 312 may include recommendations on how to modify usage so that actual usage can remain within the budgeted use for the specified budget period. The recommendations may include set points or set point schedules that may be used on the climate control device, suggestion to turn off light sources and/or electronic devices, maintenance suggestions, and specific adjustments to the climate control device.

Figure 4:
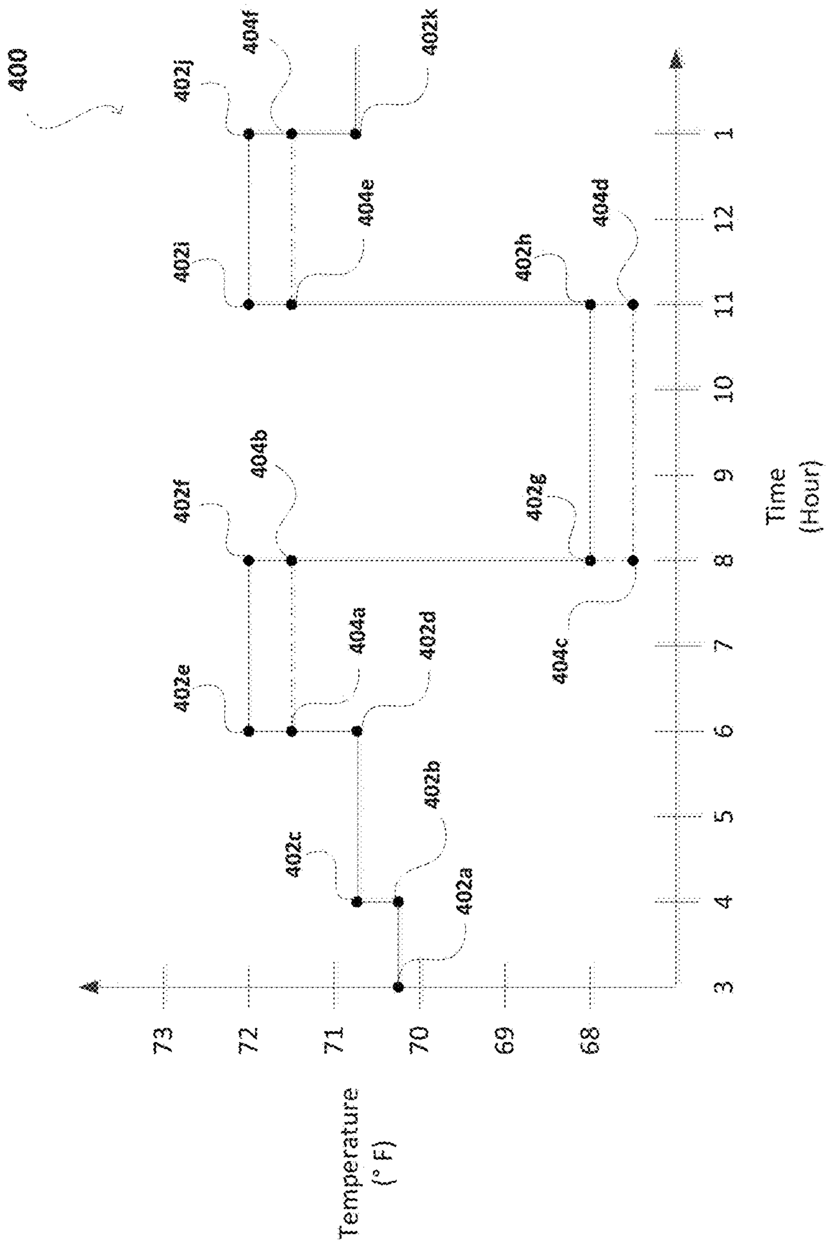
FIG. 4 illustrates an example of a set point schedule, according to certain aspects of the subject technology.

FIG. 4 illustrates an example of a set point schedule 400, according to certain aspects of the subject technology. The set point schedule 400 includes a plot of temperature set points as a function of time. In this respect, the set point schedule 400 describes a programming schedule for a climate control device such that the climate in the corresponding property can be set to a particular temperature (e.g., y-axis) at a corresponding hour in the day (e.g., x-axis).

In this example, the set point schedule 400 includes an original schedule comprised of set points 402*a-k*. The property may be set to a temperature of 70.25° F. at 3 a.m. and changes to the temperature 70.75° F. at 4 a.m. based on the schedule 400. At 6 a.m., the temperature is increased from 70.75° F. to 72° F., which remains at that temperature until 8 a.m. where the temperature is reduced down to 68° F. At 11 a.m., the temperature is raised from 68° F. to 72° F., and remains at that temperature until 1 p.m., where the temperature is reduced down to 70.75° F. The computing device may determine that the projected bill at the current setting (e.g., using the original schedule) may yield a utility bill that exceeds the target budget for the corresponding utility customer. In this respect, the set point schedule 400 may be adjusted to a new set point schedule based on a recommendation to reduce the actual energy usage to keep the projected bill within the budgeted amount, and thereby yield monetary savings for the corresponding utility customer. The adjusted set point scheduled may be comprised of set points 402*a-d*, 402*g-h*, 402*k* and 404*a-f*. In this example, separate adjustments are made between 6 a.m. and 8 a.m., between 8 a.m. and 11 a.m., and between 11 a.m. and 1 p.m. For example, the temperature is reduced by ½ a degree for each of the corresponding ranges of time. As a result, the adjusted set point schedule with the reduced temperature set points can yield a lower projected bill for the corresponding utility customer. In some aspects, the adjusted set point schedule can be communicated to the climate control device to be automatically performed and confirmed by the corresponding utility customer. In another aspect, the adjusted set point schedule may be included in the energy usage alert notification 300 (FIG. 3) to guide the utility customer on how to adjust the settings of their climate control devices.

Figure 5:
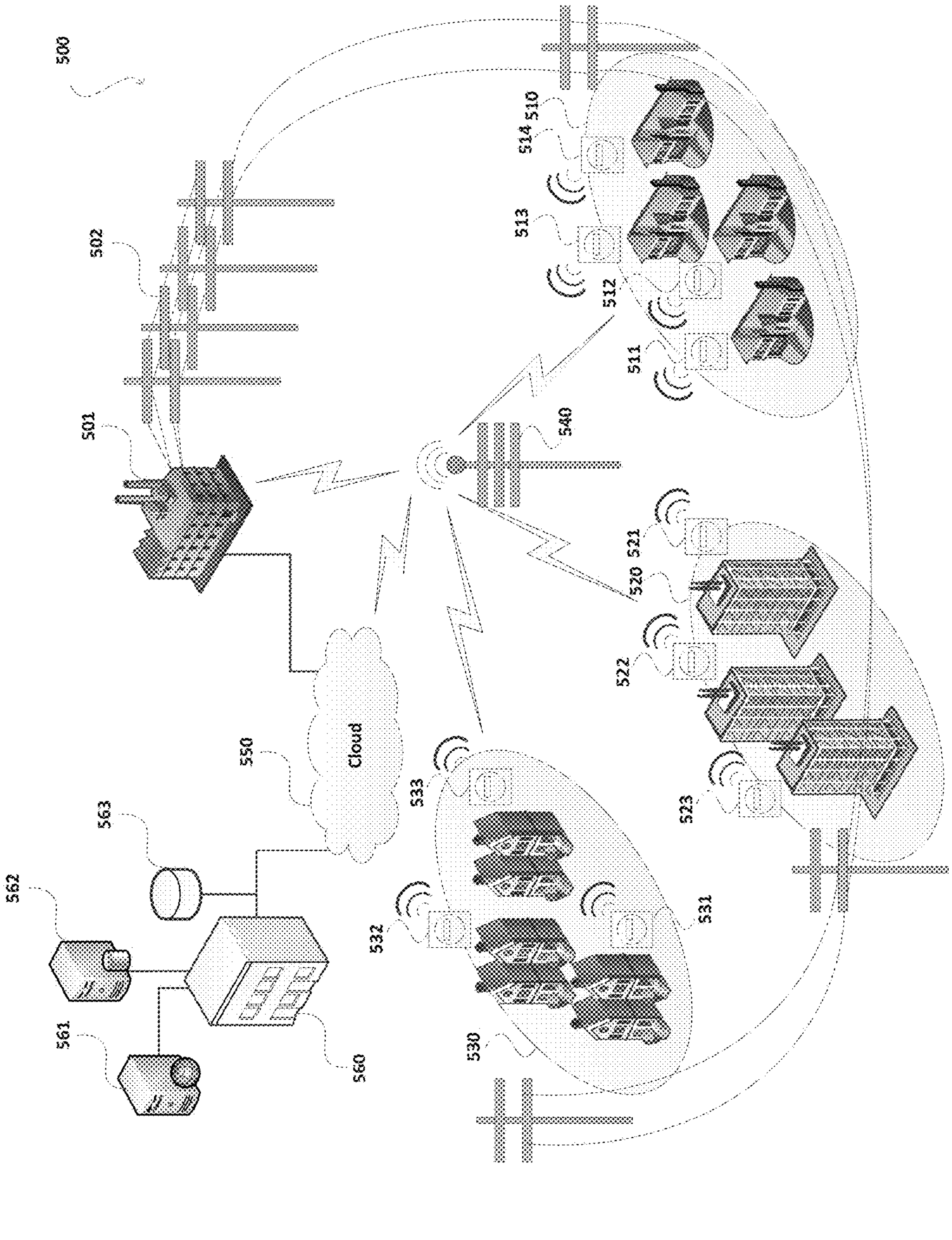
FIG. 5 illustrates an example of an environment for implementing aspects in accordance with various embodiments.

FIG. 5 illustrates an example of an environment 500 for implementing aspects in accordance with various embodiments. The environment 500 includes a utility company 501, power distribution system 502, utility customer regions 510, 520 and 530, energy usage collector 540, a network 550 and a usage alert system 560. The utility customer region 510 includes residential structures with corresponding smart meters 511-514. The utility customer region 520 includes commercial structures with corresponding smart meters 521-523. The utility customer region 530 includes multi-family structures with corresponding smart meters 531-533. The usage alert system 560 includes a web server 561, an application server 562 and a database 563.

The utility company 501 provides a commodity (e.g., electricity, gas, water) to the utility customer regions 510, 520 and 530. The utility company 501 may track the energy usage from each region via a monitoring device (e.g., a smart meter) associated with each structure of the corresponding region. The utility company 501 may receive usage data that includes the amount of energy consumption (e.g., kWH) for the corresponding utility account. In an aspect, the utility company 501 receives the usage data from the energy usage collector 540 via a wireless communication system. In some aspects, the energy usage collector 540 may obtain the usage data by pulling the usage data from each of the smart meter devices. The smart meter devices may broadcast usage data on a periodic or scheduled basis. The utility company 501 also may receive the usage data from each monitoring device through a wired communication system.

The usage alert system 560 is in communication with the utility company 501 via the network 550. The usage alert system 560 may obtain the usage data from the utility company 501 via the network 550. In an aspect, the usage alert system 560 receives the usage data via the network 550. The usage alert system 560 may receive the usage data directly from the smart meter devices.

Each of the utility customer regions 510, 520 and 530 may correspond to a separate geographical location with a respective rate schedule. In some aspects, an energy usage alert notification for a corresponding utility customer in one region may be generated using usage data of similar users in the same region to provide the corresponding utility customer with a comparative analysis of its energy consumption (e.g., current energy usage compared to similar customers in the same zip code or within a certain radius).

The usage alert system 560 also may be in communication with a third party weather service, such as the National Weather Service (not shown). For example, the usage alert system 560 may receive corresponding outdoor temperatures from the third party weather service via the network 550 (e.g., e-mails, downloaded FTP files, and XML feeds). In this respect, the usage alert system 560 may use data from the third party weather service to determine a projected use for a current billing period. For example, forecasted weather conditions (e.g., the temperature, the humidity, the barometric pressure, precipitation, etc.) may indicate that the utility customer's HVAC system is likely to be in greater use. The usage alert system 560 may estimate the projected use for the remaining amount of time of the current billing period, and thereby determine if the utility customer is on pace to exceed the projected bill based on the estimated projected use. In turn, the usage alert system 560 may notify the utility customer through an energy usage alert notification.

The usage alert system 560 communicates the energy usage alert notification to utility customers associated with the utility customer regions 510, 520 and 530. In some aspects, the usage alert system 560 communicates the energy usage alert notification via the network 550. For example, the usage alert system 560 may send the energy usage alert notification in an e-mail or the utility customer may log into the usage alert system 560 (e.g., the web server 561 and/or application server 562) through an associated website to view the disaggregated usage data included in the energy usage alert notification. The usage alert system 560 may send the energy usage information to a printing system so that the energy usage alert notification can be provided to the utility customer via regular mail (e.g., as part of a utility bill). In other embodiments, the energy usage information is communicated back to the utility company 501 such that the utility company 501 can provide the energy usage alert notification to the utility customer.

Figure 6:
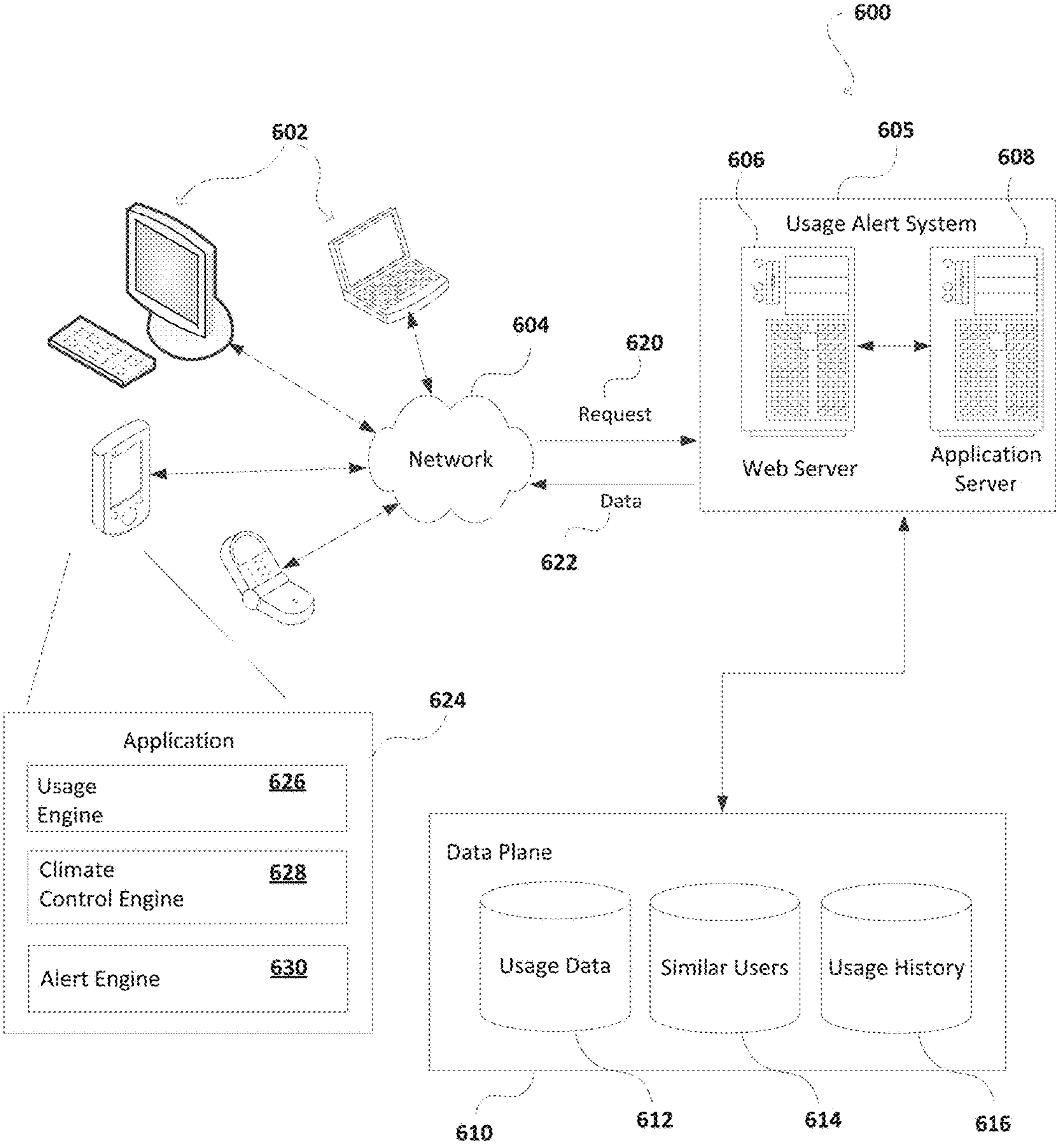
FIG. 6 illustrates an example of a system for energy usage alerts, according to certain aspects of the subject technology.

FIG. 6 illustrates an example of a system 600 for energy usage alerts, according to certain aspects of the subject technology. Although a web-based environment is described for purposes of explanation, different environments may be used, as appropriate, to implement various embodiments.

The example system 600 includes a usage alert system 605 and a data plane 610. The usage alert system 605 includes at least one web server 606 and at least one application server 608, as described below. The usage alert system 605 is an example of an energy usage notification system implemented as computer programs on one or more computers in one or more locations, in which the systems, components, and techniques described below can be implemented.

A user can interact with the usage alert system 605 through a client device 602. For example, the client device 602 can be a computer coupled to the usage alert system 605 through a data communication network 604, e.g., the Internet. In some instances, the usage alert system 605 can be implemented on the client device 602, for example, through a software application executing on the client device 602. The client device 602 generally includes a memory, e.g., a random access memory (RAM), for storing instructions and data, and a processor for executing stored instructions. The client device 602 can be any appropriate device operable to send and receive requests, messages, or other types of information over the data communication network 604. The client device 602 can also include a display screen though which the user interacting with the client device 602 can view information, e.g., energy usage alert notification 300 of FIG. 3. Some examples of client devices include personal computers, smart thermostats, cellular phones, handheld messaging devices, laptop computers, set-top boxes, personal data assistants, electronic book readers, tablet devices, smartphones and the like.

The data communication network 604 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 602 can communicate over the data communication network 604 using wired or wireless connections, and combinations thereof.

A user can use the client device 602 to submit a request 620 to log into the usage alert system 605. The request 620 can request a digital copy of an energy usage alert notification for a corresponding utility account. The energy usage alert notification may include information relating to how much energy has been consumed to date and/or a projected bill amount for a current billing period. The usage alert notification also can include information relating to one or more recommendations for adjusting settings in the property associated with the corresponding utility account such that the projected bill is kept below a target budget for the current billing period. When the user submits the request 620, the request 620 may be transmitted through the data communication network 604 to the application server 608 within the usage alert system 605. The application server 608 responds to the request 620 by using, for example, usage data 612, to identify data 622 describing an energy usage alert with personalized information in response to the request 620. The application server 608 sends the data 622 through the data communication network 604 to the client device 602 for presentation to the user.

The data 622 can include data describing a projected bill for a current billing period. The data 622 can be used, for example, by the client device 602, to generate a local energy usage alert notification with one or more interactive features such as energy consumption adjustments with corresponding utility bill projections and/or instructions for adjusting settings on a climate control device associated with the corresponding utility customer.

After receiving the data 622 from the application server 608, and through the data communication network 604, a software application, e.g., web browser or application 624, running on the client device 602 renders an interactive energy usage alert notification using the data 622. For example, a usage engine 626 in the application 624 can describe the usage to date including a projected use for the current billing period, for display on a display screen of the client device 602.

In some aspects, the application 624 includes a climate control engine 628 that is configured to render an interface to the climate control device, and perform one or more actions related to the instructions for adjusting the settings of the climate control device. In some embodiments, the climate control engine 628 is configured to obtain data relating to current settings of the climate control device. The climate control engine 628 can obtain real-time statistics and/or sensor readings (e.g., thermometer reading) of current climate conditions in the property. In an aspect, the application 624 includes an alert engine 630 that is configured to render the energy usage alert notification including allow the user to set (or program) rules and/or conditions for receiving the energy usage alert notification.

In some embodiments, the web server 606, the application server 608, and similar components, can be considered to be part of the data plane 610. The handling of all requests and responses, as well as the delivery of content between the client device 602 and the application server 608, can be handled by the web server 606. The web server 606 and the application server 608 are merely example components. However, more or fewer components can be used as structured code can be executed on any appropriate device or host machine as discussed elsewhere herein.

The data plane 610 includes one or more resources, servers, hosts, instances, routers, switches, data stores, other similar components, or a combination thereof. The resources of the data plane 610 are not limited to storing and providing access to data. Indeed, there may be several servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 610 can include several separate data tables, databases, or other data storage mechanisms and media for storing data relating to a particular aspect. For example, the data plane 610 illustrated includes mechanisms for storing usage data 612 and user information 616, which can be used to generate the energy usage alert notification. The data plane 610 is also shown to include a mechanism for storing similar user data 614, which can be used for purposes such as reporting a comparative analysis of the usage data for the corresponding utility customer. The data plane 610 is operable, through logic associated therewith, to receive instructions from the application server 608 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 6. Thus, the system 600 in FIG. 6 is provided merely as one example, and does not limit the scope of the disclosure.

Figure 7:
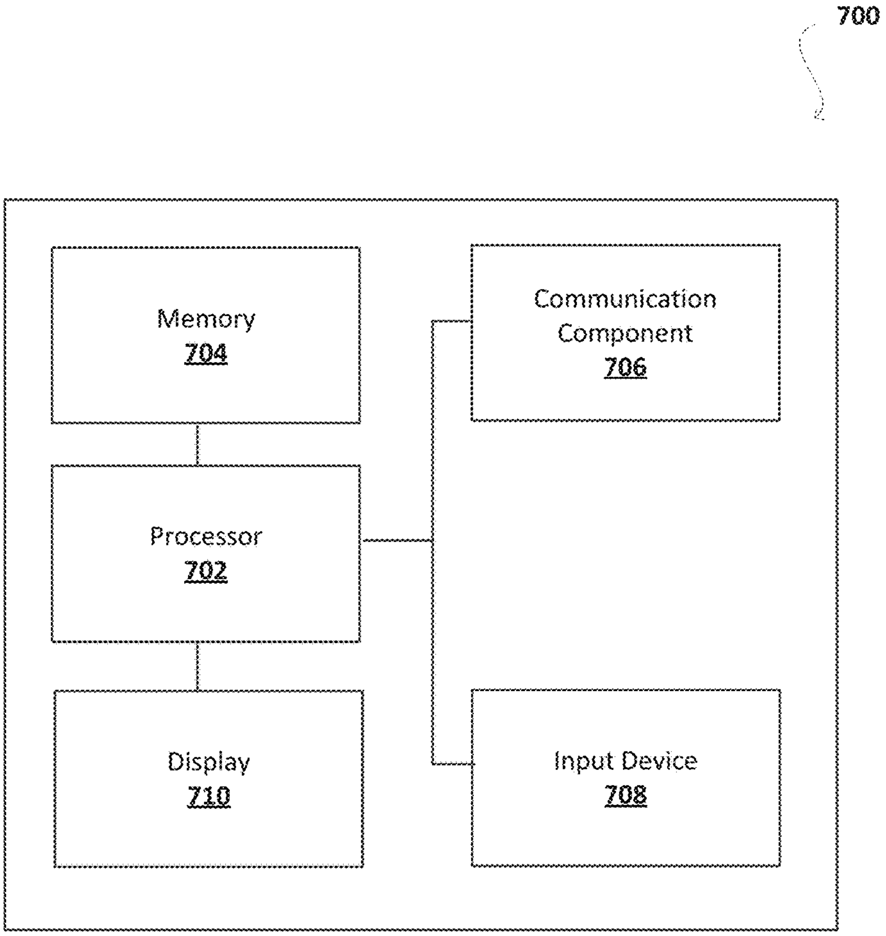
FIG. 7 illustrates an example configuration of components of a computing device, according to certain aspects of the subject technology.

FIG. 7 illustrates an example configuration of components of a computing device 700, e.g., the climate control devices 103*a*-103*n* of FIG. 1, according to certain aspects of the subject technology. In this example, the computing device 700 includes a processor 702 for executing instructions that can be stored in a memory device or element 704. The instructions may cause the computing device 700 to execute a computer-implemented method for processing energy usage alerts from the energy usage alert system 100 (FIG. 1) and/or receive instructions to automatically adjust settings (e.g., temperature settings, alarm settings, power settings) of the client computing device 700. As would be apparent to one of ordinary skill in the art, the computing device 700 can include many types of memory, data storage, or non-transitory computer-readable storage media, such as a first data storage for program instructions for execution by the processor 702, a separate storage for usage history or user information, a removable memory for sharing information with other devices, etc. In some embodiments, the computing device 700 can include one or more communication components 706, such as a Wi-Fi, Bluetooth®, radio frequency, near-field communication, wired, or wireless communication system. The computing device 700 in many embodiments can communicate with a network, such as the Internet, and may be able to communicate with other such devices (e.g., the energy usage alert system 100, other climate control devices). As discussed, the computing device 700 in many embodiments will include at least one input element 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The computing device 700 includes some type of display element 710, such as a touch screen or liquid crystal display (LCD).

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computing device for energy usage alerts, the computing device comprising:

at least one processor; and memory storing instructions that, when executed by the at least one processor, cause the computing device to:

determine at least a first candidate target budget corresponding to a specified budget period and a second candidate target budget corresponding to the specified budget period, the first candidate target budget and the second candidate target budget relating to a desired energy usage amount for a corresponding utility customer;

send instructions to display at least the first candidate target budget as a first selectable option and the second candidate target budget as a second selectable option to a climate control device associated with the corresponding utility customer;

in response to receiving an indication of a selection of the first selectable option or the second selectable option from the climate control device, determine a target budget based upon the candidate target budget associated with the selection;

obtain usage data relating to actual energy usage by one or more of a property associated with the corresponding utility customer or a component of the property based upon a sensor reading of a condition at the property;

determine a projected use relating to an estimated energy usage for a remaining amount of time in the specified budget period based at least in part on the usage data and forecasted weather data;

determine a projected bill for the corresponding utility customer based at least in part on the usage data and the projected use; and in response to determining that the projected bill is greater than the target budget:

generate a message indicative of the projected bill; and send the message to the climate control device, the message including instructions causing the climate control device to adjust one or more settings of the climate control device based upon the target budget.

2. The computing device of claim 1, wherein the target budget represents a monetary cost associated with an amount of energy consumed by at least one of the property or the component of the property.

3. The computing device of claim 1, wherein the target budget is expressed as at least one of a monetary value or an amount of energy used.

4. The computing device of claim 1, wherein the first candidate target budget is different than the second candidate target budget.

5. The computing device of claim 1, wherein at least one of the first candidate target budget or the second candidate target budget is determined using at least one of an energy usage history of the corresponding utility customer, an energy usage history of related utility customers, or energy usage history of utility customers similar to the corresponding utility customer.

6. The computing device of claim 1, wherein the condition is a temperature.

7. The computing device of claim 1, wherein the instructions further cause the computing device to:

determine a rate of use based at least in part on an energy usage history of the corresponding utility customer, the energy usage history relating to one or more of an average usage rate for a specified number of months, a usage rate during the specified budget period for one or more previous years, an average usage rate for a particular weekday or weekend, and usage rates for one or more months preceding the specified budget period.

8. The computing device of claim 7, wherein the rate of use is determined using at least one of historical weather data or forecasted weather data.

9. The computing device of claim 1, wherein the usage data relating to energy usage by the component of the property associated with the corresponding utility customer is obtained from at least one of a usage monitoring device associated with the component or a disaggregation of the usage data corresponding to the property.

10. The computing device of claim 1, wherein the message includes an indication of an amount of the target budget used to date by the corresponding utility customer.

11. The computing device of claim 1, wherein the message includes one or more recommendations on how to adjust usage by the corresponding utility customer to maintain the actual energy usage within the target budget for the specified budget period.

12. The computing device of claim 11, wherein the one or more recommendations include one or more of a set point or a set point schedule to be used on the climate control device.

13. The computing device of claim 1, wherein the instructions further cause the computing device to:

send the message via a network to the climate control device.

14. The computing device of claim 1, wherein the instructions further cause the computing device to:

cause the climate control device to display an alert notification based at least in part on the message, the alert notification providing an alert to the corresponding utility customer that the projected bill is projected to exceed the target budget.

15. A computer-implemented method for energy usage alerts, comprising:

determining at least a first candidate target budget corresponding to a specified time period and a second candidate target budget corresponding to the specified time period, the first candidate target budget and the second candidate target budget relating to a desired energy usage amount for a corresponding utility customer;

sending instructions to display at least the first candidate target budget as a first selectable option and the second candidate target budget as a second selectable option to a climate control device associated with the corresponding utility customer;

in response to receiving an indication of a selection of the first selectable option or the second selectable option from the climate control device, determining a target budget based upon the candidate target budget associated with the selection;

obtaining usage data for a property associated with the corresponding utility customer based upon a sensor reading of a condition at the property;

determining a projected use for the specified time period based at least in part on the usage data;

determining a projected bill for the corresponding utility customer based at least in part on the usage data and the projected use; and in response to determining that the projected bill is greater than the target budget:

generating a message indicative of the projected bill; and sending the message to the climate control device, the message including instructions causing the climate control device to adjust one or more settings of the climate control device based upon the target budget.

16. The computer-implemented method of claim 15, wherein the condition is a temperature.

17. The computer-implemented method of claim 15, wherein at least one of the first candidate target budget or the second candidate target budget is determined using at least one of an energy usage history of the corresponding utility customer, an energy usage history of related utility customers, or energy usage history of utility customers similar to the corresponding utility customer.

18. A non-transitory computer readable storage medium storing instructions for energy usage alerts on a computing device, the instructions when executed by a processor causing the processor to:

determine at least a first candidate target budget corresponding to a specified budget period and a second candidate target budget corresponding to the specified budget period, the first candidate target budget and the second candidate target budget relating to a desired energy usage amount for a corresponding utility customer;

send instructions to display at least the first candidate target budget as a first selectable option and the second candidate target budget as a second selectable option to a climate control device associated with the corresponding utility customer;

in response to receiving an indication of a selection of the first selectable option or the second selectable option from the climate control device, determine a target budget based upon the candidate target budget associated with the selection;

obtain usage data by one or more of a property associated with the corresponding utility customer or a component of the property;

determine a projected use relating to an estimated energy usage for a remaining amount of time in the specified budget period based at least in part on the usage data;

determine a projected bill for the corresponding utility customer based at least in part on the usage data and the projected use; and in response to determining that the projected bill is greater than the target budget:

generate a message indicative of the projected bill; and send the message to the climate control device, the message causing the climate control device to adjust one or more settings.

19. The non-transitory computer readable storage medium of claim 18, wherein the instructions further cause the processor to:

determine a rate of use based at least in part on an energy usage history of the corresponding utility customer, the energy usage history relating to one or more of an average usage rate for a specified number of months, a usage rate during the specified budget period for one or more previous years, an average usage rate for a particular weekday or weekend, and usage rates for one or more months preceding the specified budget period.

20. The non-transitory computer readable storage medium of claim 18, wherein at least one of the first candidate target budget or the second candidate target budget is determined using at least one of an energy usage history of the corresponding utility customer, an energy usage history of related utility customers, or energy usage history of utility customers similar to the corresponding utility customer.

* * * * *